(12) United States Patent
Horst

(10) Patent No.: US 8,517,588 B2
(45) Date of Patent: Aug. 27, 2013

(54) INTEGRALLY ILLUMINATED PANEL APPARATUS AND METHODS

(76) Inventor: Rainier Horst, Beelen (DE)

( * ) Notice: Subject to any disclaimer, the term of this patent is extended or adjusted under 35 U.S.C. 154(b) by 840 days.

(21) Appl. No.: 12/571,026

(22) Filed: Sep. 30, 2009

(65) Prior Publication Data

US 2011/0069512 A1    Mar. 24, 2011

Related U.S. Application Data

(60) Provisional application No. 61/194,847, filed on Sep. 30, 2008.

(51) Int. Cl.
*F21V 7/04* (2006.01)

(52) U.S. Cl.
USPC ............... 362/613; 362/217.02; 362/311.01

(58) Field of Classification Search
None
See application file for complete search history.

(56) References Cited

U.S. PATENT DOCUMENTS

| | | | |
|---|---|---|---|
| 3,968,584 | A | 7/1976 | Kingston |
| 4,903,172 | A | 2/1990 | Schoniger et al. |
| 5,147,129 | A | 9/1992 | Ku |
| 5,151,679 | A | 9/1992 | Dimmick |
| 5,163,748 | A | 11/1992 | Messinger |
| 5,217,286 | A | 6/1993 | Ming-ho |
| 5,390,436 | A * | 2/1995 | Ashall ............................ 40/546 |
| 7,108,414 | B2 | 9/2006 | McCollum et al. |
| 7,517,129 | B2 * | 4/2009 | Choi et al. ..................... 362/617 |
| 2002/0051356 | A1* | 5/2002 | Takahashi et al. .............. 362/31 |
| 2005/0152157 | A1* | 7/2005 | Nomura ......................... 362/609 |
| 2007/0062085 | A1 | 3/2007 | Pan |
| 2008/0165551 | A1* | 7/2008 | Okada et al. .................. 362/613 |

FOREIGN PATENT DOCUMENTS

| | | |
|---|---|---|
| DE | 000009016695 U1 | 1/1992 |
| DE | 000019606179 A1 | 8/1997 |
| DE | 000019731710 A1 | 2/1999 |
| DE | 000010058349 A1 | 5/2002 |
| DE | 202006019140 U1 | 2/2007 |
| DE | 102007024681 A1 | 11/2008 |
| JP | 4081803 | 3/1992 |
| JP | 6274113 | 9/1994 |
| JP | 2001/075514 | 3/2001 |
| JP | 2004-045939 * | 2/2004 |
| JP | 2004/045939 | 2/2004 |
| WO | WO2005016081 A1 | 2/2005 |
| WO | WO2006094802 A1 | 9/2006 |

* cited by examiner

*Primary Examiner* — Ashok Patel
(74) *Attorney, Agent, or Firm* — Rylander & Associates, PC; Mark Beatty; Philip R. M. Hunt

(57) ABSTRACT

An integrally illuminated panel including a transparent panel having first and second opposing faces and a perimeter edge; a channel along said perimeter edge and, a plurality of lighting elements embedded into the channel, each of said plurality of lighting elements oriented inwardly from said perimeter edge. The channel may be formed into the perimeter edge or into the panel face along the perimeter or distal from the perimeter edge. An integrally illuminated panel may include translucent and opaque panels overlaid onto the transparent panel and an edge shield.

18 Claims, 3 Drawing Sheets

INTEGRALLY ILLUMINATED PANEL APPARATUS AND METHODS

CROSS-REFERENCE TO RELATED APPLICATION

The present application claims priority to U.S. Provisional Application Ser. No. 61/194,847, filed Sep. 30, 2008, which is hereby incorporated by reference into the present application.

FIELD OF THE INVENTION

The present invention relates to integrally illuminated panels and methods for manufacturing integrally illuminated panels.

BACKGROUND

Illuminated signs using a display over an illuminated box are known and used in various forms, e.g. for train schedules, menus, advertisements and the like. In most instances illumination consists of a simple light box with a translucent front panel having information or a design disposed on it, where the front panel is illuminated by lights which are attached within the light box behind the front panel at some distance. These lights are usually fluorescent tubes because they use less energy during continuous use, or alternatively many now use light emitting diodes (LEDs). However, even when using LEDs, back lighting methods tend to be less effective illuminating signs. Moreover, such illuminated boxes are frequently quite bulky because they require a certain depth in order to accommodate the light fixtures. Furthermore, exchanging the display for a new display is a complicated job, and can be dangerous because it requires that the box be opened.

SUMMARY AND ADVANTAGES

The present invention provides a novel apparatus and method for manufacturing a sign or a similar display with integral lighting, which ensures superior illumination with minimal energy consumption and a light weight, compact, weather-resistant design, and a simple manufacturing process. Additionally, the present invention provides for efficient simultaneous forward and rearward illumination using a single thin panel. The present invention also provides a novel and very efficient apparatus for area lighting.

It is known to attempt to project light into a transparent material from outside the material. However, the inventor discovered that lighting elements embedded into a transparent panel along its perimeter edge, such that they are optically coupled with the transparent panel and directed inward (i.e. toward the centerline from a straight edge or toward the center point from a curved edge), distributes the light over the front and back surfaces evenly and provides an even and bright back illumination for any overlaid design. The lighting elements may be optically coupled by injecting clear sealant into the void between the lighting element face and the edge of the panel and allowing the sealant to cure. In this way, there is no need to polish the edges to provide optical coupling. Polishing is a time consuming and costly process.

Another factor which enhances the light distribution within the transparent panel has to do with the arrangement of the lighting elements. Lighting elements may be formed into lighting strips for easy insertion and to provide a single power and control connection. LED lights are especially conducive to this arrangement due to their compactness, low heat generation, and directional light distribution. When an LED lighting strip is inserted into the channel it is positioned in such a way that the LED lights rest against the bottom and side wall of the channel and send out their directional illumination toward the center of the panel. Void spaces in the channel can be sealed with transparent liquid resin which cures to a solid, providing optical coupling with the transparent panel and sealing the lighting elements from water and weather. Alternatively, sealant may be applied merely to the gap between the lighting element and the inner wall of the channel so as to seal the lighting element and provide optical coupling to the transparent panel, in order to minimize the amount of sealant required. Sealing the space between the lighting element and the channel wall is the critical element to ensure efficient and even illumination. Sealing the remaining void space in the channel may be desirable to provide water proofing, weather proofing, structural strength, aesthetics or other reasons. Creating the channel can be accomplished through commonly available manufacturing methods. It is not necessary to smooth out or polish the groove because the sealant provides optical coupling between the lighting elements and the transparent panel, so inexpensive machining and manufacturing methods are usable.

In testing, the inventor has found that an integrally illuminated panel of the present invention improves energy efficiency significantly, and is up to 90% more efficient than conventional back lit displays using incandescent lighting. The present invention also produces significantly less heat, which reduces energy loads on a building's HVAC systems and allows use of thinner, less costly panel materials.

Still other features would be desirable in a lighted display. For example, (1) compact and thin dimensions; (2) low weight; (3) high energy efficiency; (4) two-sided displays; (5) easily made waterproof; (6) can be embedded into other devices; (7) very easy to change out displays; (8) inexpensive to produce; and (9) simple and inexpensive to change out display designs.

An integrally illuminated panel includes a transparent panel having first and second opposing faces and a perimeter edge; and, a plurality of lighting elements embedded into the transparent panel along the perimeter edge, each of the plurality of lighting elements oriented inwardly from the perimeter edge. An integrally illuminated panel includes, wherein the transparent panel further includes a channel formed into the transparent panel extending along the perimeter edge, and wherein the plurality of lighting elements is embedded into the transparent panel within the channel. An integrally illuminated panel includes, wherein the channel is formed into the perimeter edge. An integrally illuminated panel includes, wherein the channel is formed into the transparent panel first face. An integrally illuminated panel includes transparent sealant injected into the channel around said plurality of lighting elements. An integrally illuminated panel includes a first translucent display panel overlaid onto the transparent panel first face. An integrally illuminated panel includes a second translucent display panel overlaid onto the transparent panel second face. An integrally illuminated panel includes an opaque panel overlaid onto the transparent panel second face. An integrally illuminated panel includes, wherein the opaque panel includes a light-reflective surface and the light-reflective surface is overlaid adjacent to the transparent panel second face. An integrally illuminated panel includes, wherein the opaque panel includes a light-absorbing surface and the light-absorbing surface is overlaid adjacent to the transparent panel second face. An integrally illuminated panel includes an edge shield along the perimeter edge. An integrally illuminated panel includes, wherein the edge shield has a substantially U-shaped cross-section having first and second flanges and a bridge portion connecting the first and second flanges, the first and second flanges extending inwardly from the perimeter edge at least as far as the plurality of lighting elements. An integrally illuminated panel includes, wherein the plurality of lighting elements comprises LED lights. An integrally illuminated panel includes, wherein the transparent panel is clear acrylic. An integrally illuminated panel includes, wherein the transparent sealant is clear acrylic resin. An integrally illuminated panel includes a supporting frame engaging the transparent panel around the perimeter edge. An integrally illuminated panel includes, wherein the frame retains the first and second translucent panels and the opaque panel against the transparent panel first or second face.

An integrally illuminated panel, includes a transparent panel having first and second opposing faces and a perimeter edge; a channel formed into the transparent panel first face distal from the panel perimeter edge, the channel circumscribing a substantially closed path defining a lighted region; and, a plurality of lighting elements embedded into the channel, each of the plurality of lighting elements oriented toward the circumscribed interior of the lighted region. An integrally illuminated panel may include: a translucent panel overlaid onto at least one of the transparent panel first and second faces and at least partially overlapping the lighted region. An integrally illuminated panel may include an opaque panel overlaid onto at least one of the transparent panel first and second faces and at least partially overlapping the lighted region.

A method of making an integrally illuminated panel is shown and includes: providing transparent panel having a first and second opposing faces, and a perimeter edge; embedding a plurality of lighting elements into the transparent panel along the perimeter edge, the lighting elements oriented inwardly from the perimeter edge. A method for making an integrally illuminated panel includes sealing the plurality of lighting elements into the transparent panel. A method for making an integrally illuminated panel includes inserting a plurality of lighting elements into the transparent panel along the perimeter edge including the steps of: providing a channel along the perimeter edge of the transparent panel; and, inserting the plurality of lighting elements into the channel along the perimeter edge of the transparent panel. A method for making an integrally illuminated panel includes sealing the plurality of lighting elements into the transparent panel, wherein the step of sealing includes injecting liquid resin around each of the plurality of lighting elements and between each of the lighting elements, and curing the liquid resin. A method for making an integrally illuminated panel includes: providing a translucent display panel; and, overlaying the translucent display panel onto the transparent panel first face. A method for making an integrally illuminated panel includes: providing an opaque panel; and, overlaying the opaque panel onto the transparent panel second face. A method for making an integrally illuminated panel includes wherein the opaque panel includes a light-reflective face, and wherein the step of overlaying the opaque panel onto the transparent panel second face includes placing the light-reflective face against the transparent panel second face. A method for making an integrally illuminated panel includes wherein the opaque panel includes a light-absorbing face, and wherein the step of overlaying the opaque panel onto the transparent panel second face includes placing the light-absorbing face against the transparent panel second face. A method for making an integrally illuminated panel includes: providing a second translucent display panel; and, overlaying the first and second translucent display panels onto the transparent panel first and second faces, respectively.

A method of making an integrally illuminated panel is provided, including the steps of: providing transparent panel having a first and second opposing faces, and a perimeter edge; forming a channel into the transparent panel first face, along the perimeter edge of the transparent panel; embedding a plurality of lighting elements into the transparent panel along the perimeter edge, the lighting elements oriented inwardly from the perimeter edge; injecting liquid resin around each of the plurality of lighting elements and between each of the lighting elements and the transparent panel; and, curing the liquid resin. A method of making an integrally illuminated panel includes applying a light-reflective layer to the perimeter edge. A method of making an integrally illuminated panel includes applying a light-absorbing layer to the perimeter edge. A method of making an integrally illuminated panel includes applying a light-reflective layer to the transparent panel second face. A method of making an integrally illuminated panel includes applying a light absorbing layer to the transparent panel second face. A method of making an integrally illuminated panel includes applying a translucent display layer to at least the transparent panel first face.

The integrally illuminated panel of the present invention presents numerous advantages, including: (1) compact and thin dimensions; (2) low weight; (3) high energy efficiency; (4) two-sided displays; (5) easily made waterproof; (6) can be embedded into other devices; (7) very easy to change out displays; (8) inexpensive to produce; and (9) simple and inexpensive to change out display designs.

Additional advantages of the invention will be set forth in part in the description which follows, and in part will be obvious from the description, or may be learned by practice of the invention. The advantages of the invention may be realized and attained by means of the instrumentalities and combinations particularly pointed out in the appended claims. Further benefits and advantages of the embodiments of the invention will become apparent from consideration of the following detailed description given with reference to the accompanying drawings, which specify and show preferred embodiments of the present invention.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

REFERENCE NUMBERS USED IN DRAWINGS

The following list of drawing part numbers are provided for reference only:

| Number | Description |
| --- | --- |
| 10 | Integrally illuminated sign |
| 12 | Transparent panel |
| 14 | Panel first face |
| 16 | Panel second face |
| 18 | Panel perimeter edge |
| 20 | Lighting strip |
| 22 | Lighting element |
| 24 | Sealant |
| 26 | Channel |
| 28 | Perimeter edge shield |
| 30 | Perimeter edge shield interior surface |
| 32 | Display |
| 34 | Back panel |
| 36 | Frame |
| 38 | Frame first retaining portion |
| 40 | Frame hinge |
| 42 | Frame second retaining portion |
| 44 | Frame sidewall |
| 46 | Second panel inward-facing surface |
| 110 | Integrally illuminated sign |
| 112 | Transparent panel |
| 114 | Panel first face |
| 116 | Panel second face |
| 118 | Panel perimeter edge |
| 120 | Lighting strip |
| 122 | Lighting element |
| 124 | Sealant |
| 126 | Channel |
| 128 | Perimeter edge shield |
| 130 | Perimeter edge shield interior surface |
| 132 | Display |
| 134 | Back panel |
| 136 | Frame |
| 138 | Frame first retaining portion |
| 140 | Frame hinge |
| 142 | Frame second retaining portion |
| 144 | Frame sidewall |
| 146 | Second panel inward-facing surface |
| 150 | Perimeter edge shield first flange |
| 152 | Perimeter edge shield second flange |
| 154 | Perimeter edge shield bridge |
| 156 | Channel outside wall |
| 158 | Channel bottom wall |

DETAILED DESCRIPTION

Before beginning a detailed description of the subject invention, mention of the following is in order. When appropriate, like reference materials and characters are used to designate identical, corresponding, or similar components in differing figure drawings. The figure drawings associated with this disclosure typically are not drawn with dimensional accuracy to scale, i.e., such drawings have been drafted with a focus on clarity of viewing and understanding rather than dimensional accuracy.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In this specification, reference is made to "light", "illuminated", "lighting elements", "light-reflective", and similar terms. Such terms are intended to include the entire visible and near-visible spectrum of wavelengths including near-infrared and ultraviolet light (sometimes referred to as "black light").

Figure 1:
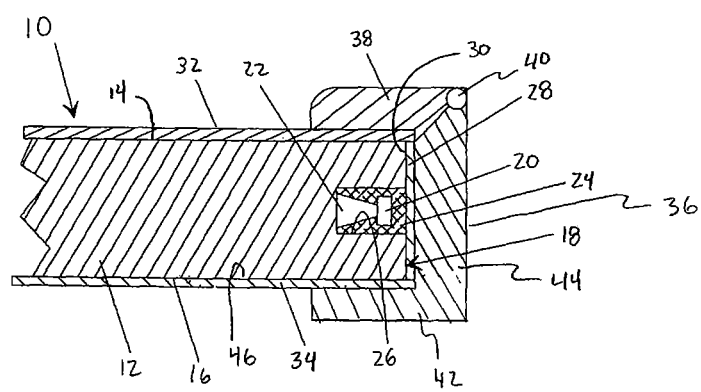
FIG. 1 shows a cut away view of a first embodiment and method for manufacturing the same.
Figure 3:
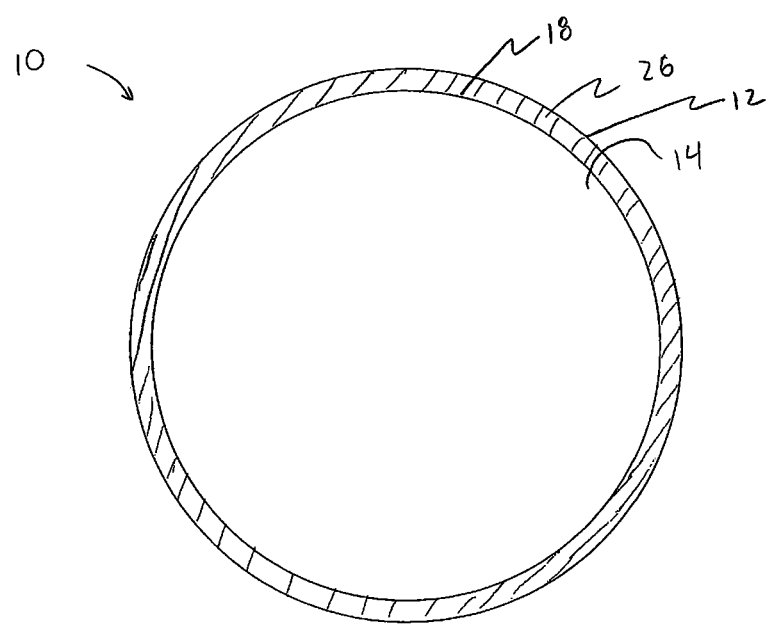
FIG. 3 shows a plan view of a first embodiment and method for manufacturing the same.

Referring to FIGS. 1 & 3 a first embodiment of an integrally illuminated sign 10 is shown and includes a transparent panel 12 having a first face 14, an opposing second face 16, a perimeter edge surface 18, and a plurality of lighting elements 22 embedded within transparent panel 12 along perimeter edge 18.

Integrally illuminated panel 10 includes a display 32 overlaying transparent panel 12 on first face 14. Display 32 may be an applied design, such as applying ink, paint, or etching directly to the face 14, or a sheet or panel overlaid onto panel 12. In the embodiment, display 32 is a removable panel mounted to sign 10 so as to overlay transparent panel 12. When lighting elements 22 are lit the light emits evenly from transparent panel 12 through display 32 to provide an illuminated sign. Display 32 may also simply consist of a translucent panel which provides muted flat lighting. Translucent panels of selected colors may be provided which can be changed easily.

In the first embodiment, the plurality of lighting elements 22 is provided in a lighting strip 20 for ease of manufacture and wiring. Lighting strip 20 is sealed into transparent panel 12 with sealant material 24, which cures to a solid. In the embodiment sealant material 24 is a transparent material which cures into a solid and bonds with transparent panel 12, such as clear acrylic resin, but may be another transparent resin or transparent glass. In the embodiment transparent panel 12 and sealant material 24 are made from the same material or from materials with minimal differences in their refraction indexes, in order to maximize the efficiency of light transmitted from lighting elements 22 into transparent panel 12. In the first embodiment, both transparent panel 12 and sealant material 24 are clear acrylic.

Referring to FIGS. 1 & 3, in a first embodiment channel 26 is provided along perimeter edge 18 for embedding lighting elements 22. Channel 26 may be created in panel 12 by machining, or may be formed into panel 12 during the fabrication of panel 12, such as by extrusion, injection molding, or conventional pour molding methods.

In a first embodiment, lighting elements 22 are high efficiency low-voltage light-directional LED lights. LED lights are very efficient, operate at lower temperatures and are therefore less likely to cause warping of transparent panel 20, are compact enough to fit into channel 26, long-lasting, rugged, and easy to configure as directional lights. LED lights are also easily manufactured to be small enough to fit into a thin panel. "Directional" in this regard means that the light produced is primarily oriented in a selected direction, which improves the efficiency of the lighting by directing more light into transparent panel 12. In the first embodiment, lighting elements 22 are 0.9 watt white LED lights.

Referring to FIGS. 1 & 3, edge shield 28 is provided to prevent light from leaking out through perimeter edge 18. In the embodiment edge shield 28 is an opaque coating applied to perimeter edge 18. Alternatively, edge shield 28 may be a strip of opaque material wrapped around perimeter edge 18, or adhered to perimeter edge 18. Edge shield 28 is opaque to prevent light leakage through perimeter edge 18 which creates a distracting, aesthetically degraded presentation. Edge shield 28 includes an inner surface 30 in contact with perimeter edge 18. In the embodiment inner surface 30 is light-reflective to reflect leaking light back into transparent panel 12 for improved efficiency. Alternatively, inner surface 30 may be light absorbent to prevent unwanted glare in the perimeter region of transparent panel 12.

Referring to FIGS. 1 & 3, the first embodiment includes first panel 32 and second panel 34, overlaid onto transparent panel 12 on first face 14 and second face 16, respectively. In the first embodiment, first panel 32 is at least partially or selectively translucent for displaying a design or sign, and second panel 34 is opaque, having an inward-facing surface 46 facing inward toward transparent panel 12. In the embodiment inward-facing surface 46 is light-reflective, such as a white surface. Alternatively, inward-facing surface 46 may have a light-absorbing coating or material, so as to reduce glare. Alternatively, both first and second panels 32 and 34 may be partially or selectively translucent for displaying designs or signs. Alternatively, first and/or second panels 32 and 34 may be uniformly translucent to provide a muted light source.

Referring to FIGS. 1 & 3, a frame 36 is provided. Frame 36 is substantially U-shaped, having a first retaining portion 38, a second retaining portion 42, and a sidewall 44 connecting the first and second retaining portions 38 and 42. In the embodiment first retaining portion 38 is connected to sidewall 44 by a hinge 40, so that display 32 may be easily installed and removed. In the embodiment hinge 40 is a spring-loaded hinge or a locking hinge, to retain display 32 against transparent panel 12. Second retaining portion 42 may also be connected to sidewall 44 by a hinge if desired to provide a changeable display 34 over second face 16. Alternatively, frame 36 may be a rigidly constructed frame without hinging. In the first embodiment, frame 36 provides structure for mounting integrally illuminated panel 10 to a wall or other support, may provide increased rigidity for thin transparent panel 12, and provides space for routing electrical wiring to lighting strip 20. Frame 36 assists in reducing glare around the perimeter edge 18 and channel 26 which would detract from the aesthetic appeal of the integrally illuminated panel 12.

Referring to FIGS. 1 & 3, in the first embodiment transparent panel 12 is 8 mm (0.32 inch) thick clear acrylic sheet and lighting elements 22 are 0.9 watt white LED lights combined in a single string 22, and sealed into channel 26 by clear acrylic resin 24. Transparent panel 12 is approximately 1 m (3 feet) in diameter, or span, and lighting elements 22 are spaced approximately one every 10 cm (4 inches), which provides adequate brightness and even light distribution for an informational display without creating uncomfortable glare. The inventor has found that for spans beyond approximately 2 m (6 feet) higher wattage lighting elements are desirable. Of course, a user may increase the density or power of the lighting elements for a brighter backlighting, or for displays with greater spans. The precise choice of lighting elements and density will be determined by the particular panel materials chosen, the size of the panel, and the desired intensity of lighting, which will vary depending on the particular application. In the first embodiment, display 32 is a sign printed onto translucent plastic sheeting approximately the thickness of construction paper. Display panels 32 may be printed with information to display, provided with a design, or simply be a uniform translucence with or without color. Display panels 32 may be flexible sheets, or may be provided as rigid panels. Alternatively, displays may be applied directly to either or both of opposing first and second faces 14 and 16 by ink, paint, etching, or other methods.

Light strip 22 for a channel 24 tracing a polygonal path may comprise a straight light strip 22 for each polygon leg as it may be difficult to bend the light strip around sharp corners. In this regard the multiple straight strips are defined to comprise a single strip encompassing the channel.

Figure 2:
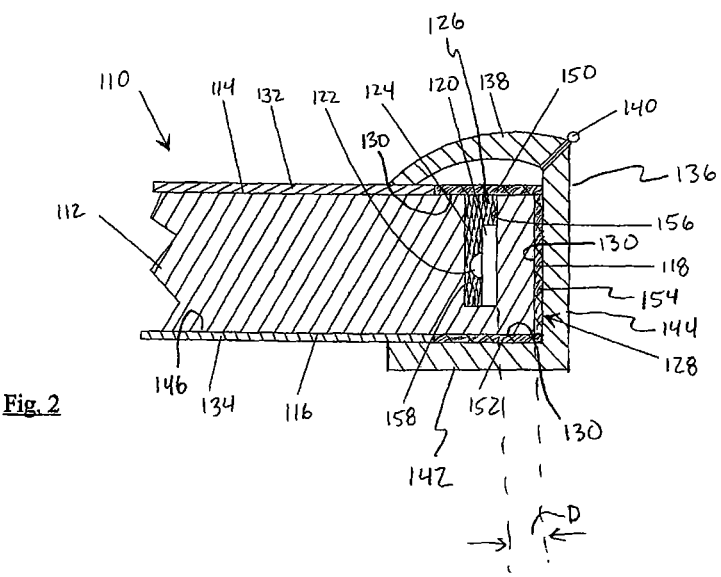
FIG. 2 shows a cut away view of a second embodiment and method for manufacturing the same.
Figure 4:
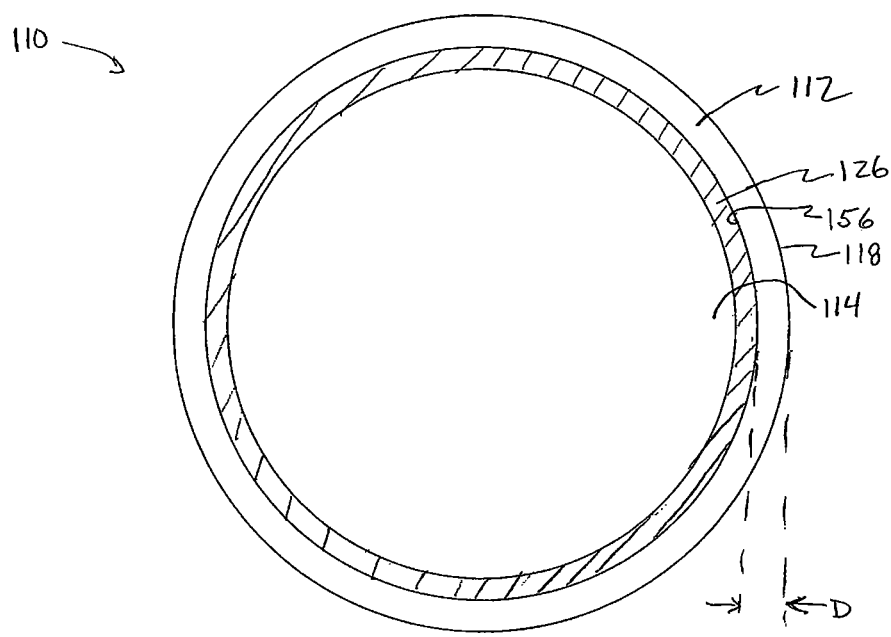
FIG. 4 shows a plan view of a second embodiment and method for manufacturing the same.

Referring to FIGS. 2 & 4, a second embodiment of an integrally illuminated panel 110 is shown, and includes a transparent acrylic panel 112 having a first face 114, an opposing second face 116, a perimeter edge surface 118, and a plurality of lighting elements 122 embedded within transparent panel 112 along perimeter edge 118.

Channel 126 is provided along perimeter edge 118 for embedding lighting elements 122. Channel 126 extends through first face 114 into the body of transparent panel 112. Channel 126 preferably is oriented with channel outside wall 156 substantially perpendicular to the plane of panel 112 and channel bottom wall 158 substantially parallel to the plane of panel 112, so that lighting elements may be easily mounted and oriented to face inwards toward the center of transparent panel 112. The cross-section of channel 126 may be altered to accommodate lighting elements with differing body shapes, if necessary.

Integrally illuminated panel 110 includes a display 132 overlaying transparent panel 112 on first face 114. Display 132 may be an applied design, such as applying ink, paint, or etching directly to the face 114, or a sheet adhered to panel 112. In the embodiment, display 132 is a removable panel mounted to sign 110 so as to overlay transparent panel 112. When lighting elements 122 are lit the light emits evenly from transparent panel 112 through display 132 to provide an illuminated sign. Display 132 may also simply consist of a translucent panel which provides muted flat lighting. Translucent panels of selected colors may be provided which can be changed easily.

In the second embodiment, the plurality of lighting elements 122 is provided in a lighting strip 120 for ease of manufacture and wiring. Lighting strip 120 is sealed into transparent panel 112 with sealant material 124, which cures to a solid. In the embodiment sealant material 124 is a transparent material which cures into a solid and bonds with transparent panel 112, such as clear acrylic resin, but may be another transparent material such as resin or glass. In the embodiment transparent panel 112 and sealant material 124 are made from the same material or from materials with minimal differences in their refraction indexes, in order to maximize the efficiency of light transmitted from lighting elements 122 into transparent panel 112. In the second embodiment, both transparent panel 112 and sealant material 124 are clear acrylic. In the embodiment transparent panel 112 is transparent acrylic, but may be any suitably workable material, such as conventional glass, quartz glass, polycarbonate, clear PVC, clear resin, or similar material which can be formed into panels and accept a channel for receiving and sealing lighting elements.

Channel 126 is proximal to perimeter edge 118, but offset inwardly a distance D. In the second embodiment channel 126 traces the same path as perimeter edge 118 at a constant offset distance D. Alternatively, channel 126 may trace an independent path, dissimilar to perimeter edge 118. Offset distance D may be substantial, such that channel 126 creates the effect of an embedded display area within a larger transparent panel 112. For example, a rectangular transparent panel 112 may be inscribed by a circular channel 126, or a circular transparent panel 112 may be inscribed by a rectangular channel 126. Channel 126 may trace any substantially closed shape, such as a circle, polygon, or complex curve. Lighting elements 122 may be distributed evenly along channel 126, or may be varied in density depending on the shape of channel 126 so as to provide even lighting throughout integrally illuminated panel 110.

Channel 126 may be formed in panel 112 by machining, or may be formed into panel 112 during the fabrication of panel 112, such as by extrusion, injection molding, or conventional pour molding methods.

In the second embodiment, lighting elements 122 are high efficiency, low-voltage, directional, 0.9 watt LED lights, connected in a lighting strip 120. Channel 126 is rectilinear in cross-section, including a back wall 156 and a bottom wall 158. Lighting elements 122 are inserted into channel 126 against back wall 156 and bottom wall 158, thereby automatically aligning lighting elements 122 inwards toward the center of transparent panel 112. Clear acrylic sealant 124 fills channel 126 and cures to a clear solid, bonding lighting elements to clear acrylic panel 112 and sealing them against weather and damage.

Perimeter edge shield 128 encloses perimeter edge 118 and channel 126. Perimeter edge shield 128 is substantially U-shaped, having first and second flanges 150 and 152 connected by bridge portion 154. First and second flanges 150 and 152 extend inwardly beyond channel 126. Perimeter edge shield 128 is opaque to prevent light leakage around the perimeter edge of integrally illuminated panel 110 creating glare. Perimeter edge shield 128 includes inner surfaces 130. In the embodiment inner surfaces 130 are light-reflective to reflect light back into transparent panel 112. Alternatively, inner surfaces 130 may be light absorbent to reduce glare.

Referring to FIGS. 2 & 4, the second embodiment includes first panel 132 and second panel 134, overlaid onto transparent panel 112 on first face 114 and second face 116, respectively. In the first embodiment, first panel 132 is at least partially or selectively translucent for displaying a design or sign, and second panel 134 is opaque, having an inward-facing surface 146 facing inward toward transparent panel 112. In the embodiment inward-facing surface 146 is white. Alternatively, inward-facing surface 146 may have a light-absorbing coating or material, so as to reduce glare. Alternatively, both first and second panels 132 and 134 may be partially or selectively translucent for displaying designs or signs. Alternatively, first and/or second panels 132 and 134 may be uniformly translucent to provide a muted light source.

Referring to FIGS. 2 & 4, a frame 136 is provided. Frame 136 is substantially U-shaped, having a first retaining portion 138, a second retaining portion 142, and a sidewall 144 connecting the first and second retaining portions 138 and 142. In the embodiment first retaining portion 138 is connected to sidewall 144 by a hinge 140, so that display 132 may be easily installed and removed. In the embodiment hinge 140 is a spring-loaded hinge or a locking hinge, to retain display 132 against transparent panel 112. Second retaining portion 142 may also be connected to sidewall 144 by a hinge if desired to provide a changeable display 134 over second face 116. Alternatively, frame 136 may be a rigidly constructed frame without hinging. In the first embodiment, frame 136 provides structure for mounting integrally illuminated panel 110 to a wall or other support, may provide increased rigidity for thin transparent panel 112, and provides space for routing electrical wiring to lighting strip 120. Frame 136 assists in reducing glare around the perimeter edge 118 and channel 126 which would detract from the aesthetic appeal of the integrally illuminated panel 112.

In the embodiment the hardened sealant 24 or 124 and the transparent panel 12 or 112 have similar thermal expansion characteristics to prevent cracking and warping.

In the embodiment transparent panel 12 or 112 has a thickness between 6 mm and 12 mm if the panel is made from transparent acrylic. Through testing the inventor has found this range to provide an adequate mechanical stability for an acrylic panel, as well as the needed thickness to form groove 26 or 126 by machining using generally available tools. A thinner transparent panel 12 or 112 may be used as well. With thinner panels it is desirable to incorporate an edge shield 128 as shown in FIG. 2, and/or a mounting frame 36 or 136 for structural support. Thicker panels may be used as well but weight becomes a consideration in the installation. When using more brittle materials for transparent panel 12 or 112, such as glass, thinner panels become very difficult to machine without breaking the panel, so it is preferable to form grooves 26 or 126 into the panel during the molding or extrusion process.

In use an integrally illuminated panel may be used as a display sign for information, advertising, map displays, artistic purposes, or may be used as a low glare lighting appliance. Alternatively, an integrally illuminated panel may be used as a lighted table top or bar top surface. Alternatively, an integrally illuminated panel may be used for underwater lighting or display. Alternatively, an integrally illuminated panel may be used as a lighted display counter.

Alternatively, an integrally illuminated panel may be used as a mounting for a precious or semi-precious stone for jewelry, by mounting the stone onto a small integrally lighted panel, and providing a compact battery power supply to energize the lighting elements.

A method of making an integrally illuminated panel is disclosed.

A method of making an integrally illuminated panel, comprises the steps of: providing a transparent panel having first and second opposing faces, and a perimeter edge; and, embedding a plurality of lighting elements into said transparent panel along said perimeter edge, said lighting elements oriented inwardly from said perimeter edge.

The method may include wherein the step of inserting a plurality of lighting elements into said transparent panel along said perimeter edge includes the steps of: providing a channel along said perimeter edge of said transparent panel; and, inserting said plurality of lighting elements into said channel along said perimeter edge of said transparent panel.

The method may further comprise the step of sealing said plurality of lighting elements into said transparent panel.

The method may include wherein said step of sealing said plurality of lighting elements into said transparent panel includes the steps of: injecting liquid resin around each of said plurality of lighting elements; and, curing said liquid resin.

The method may include further comprising the steps of: providing a translucent display panel; and, overlaying said translucent display panel onto said transparent panel first face.

The method may further comprise the steps of: providing an opaque panel; and, overlaying said opaque panel onto said transparent panel second face.

The method may include wherein said opaque panel includes a light-reflective face, and wherein said step of overlaying said opaque panel onto said transparent panel second face includes placing said light-reflective face against said transparent panel second face.

The method may include wherein said opaque panel includes a light-absorbing face, and wherein said step of overlaying said opaque panel onto said transparent panel second face includes placing said light-absorbing face against said transparent panel second face.

The method may further comprise the step of: providing a second translucent display panel; and, overlaying said first and second translucent display panels onto said transparent panel first and second faces, respectively.

An alternative method of making an integrally illuminated panel, comprises the steps of: providing transparent panel having a first and second opposing faces, and a perimeter edge; forming a channel into said perimeter edge of said transparent panel; embedding a lighting strip into said channel, said lighting strip comprising: a flexible strip having first and second ends and first and second faces; a plurality of lighting elements attached to said flexible strip, said lighting elements oriented normal to said flexible strip first face; injecting sealant into said channel around each of said plurality of lighting elements; and, curing said sealant.

A method of making an integrally illuminated panel may comprise the additional steps of: providing a translucent display panel; and, overlaying said translucent display panel onto said transparent panel first face.

A method of making an integrally illuminated panel may comprise the additional steps of providing an opaque panel; and, overlaying said opaque panel onto said transparent panel second face.

A method of making an integrally illuminated panel may include wherein said opaque panel includes a light-reflective face, and wherein said step of overlaying said opaque panel onto said transparent panel second face includes placing said light-reflective face against said transparent panel second face.

A method of making an integrally illuminated panel may include wherein said opaque panel includes a light-absorbing face, and wherein said step of overlaying said opaque panel onto said transparent panel second face includes placing said light-absorbing face against said transparent panel second face.

A method of making an integrally illuminated panel may comprise the additional steps of: providing a second translucent display panel; and, overlaying said first and second translucent display panels onto said transparent panel first and second faces, respectively.

Another alternative method of making an integrally illuminated panel, comprises the steps of: providing transparent panel having a first and second opposing faces, and a perimeter edge; forming a channel into said transparent panel first face, along said perimeter edge of said transparent panel; embedding a plurality of lighting elements into said transparent panel along said perimeter edge, said lighting elements oriented inwardly from said perimeter edge; injecting sealant into said channel around each of said plurality of lighting elements; and, curing said sealant.

A method of making an integrally illuminated panel may further comprise the step of applying a light-reflective layer to said perimeter edge.

A method of making an integrally illuminated panel may further comprise the step of applying a light-absorbing layer to said perimeter edge.

A method of making an integrally illuminated panel may further comprise the step of applying a light-reflective layer to said transparent panel second face.

A method of making an integrally illuminated panel may further comprise the step of applying a light absorbing layer to said transparent panel second face.

A method of making an integrally illuminated panel may further comprise the steps of applying a translucent display layer to at least said transparent panel first face.

A method of making an integrally illuminated panel may further comprise the steps of applying a second translucent display layer to said transparent panel second face.

Referring to FIGS. 1 & 3, a method of making an integrally illuminated panel 10 is shown and includes: providing transparent panel 12 having a first and second opposing faces 14 and 16, and a perimeter edge 18; embedding a plurality of lighting elements 22 into said transparent panel 12 along said perimeter edge 18, said lighting elements 22 oriented inwardly from said perimeter edge 18. A method for making an integrally illuminated panel 10 includes sealing said plurality of lighting elements 22 into said transparent panel 12, using clear sealant 24. A method for making an integrally illuminated panel 10 includes inserting a plurality of lighting elements 22 into said transparent panel 12 along said perimeter edge 18 including the steps of: providing a channel 26 along said perimeter edge 18 of said transparent panel 12; and, inserting said plurality of lighting elements 22 into said channel 26 along said perimeter edge 18 of said transparent panel 12. A method for making an integrally illuminated panel 10 includes sealing said plurality of lighting elements 22 into said transparent panel 12, wherein the step of sealing includes injecting liquid resin 24 around each of said plurality of lighting elements 20, and curing said liquid resin 20. A method for making an integrally illuminated panel 10 includes: providing a translucent display panel 32; and, overlaying said translucent display panel 32 onto said transparent panel 12 first face 14. A method for making an integrally illuminated panel 10 includes: providing an opaque panel 34; and, overlaying said opaque panel 34 onto said transparent panel second face 16. A method for making an integrally illuminated panel 10 includes wherein said opaque panel 34 includes a light-reflective face 46, and wherein said step of overlaying said opaque panel 34 onto said transparent panel second face 16 includes placing said light-reflective face 46 against said transparent panel second face 16. A method for making an integrally illuminated panel 10 includes wherein said opaque panel 34 includes a light-absorbing face 46, and wherein said step of overlaying said opaque panel 34 onto said transparent panel second face 16 includes placing said light-absorbing face 46 against said transparent panel second face 16. A method for making an integrally illuminated panel 10 includes: providing a second translucent display panel 34; and, overlaying said first and second translucent display panels 32 and 34 onto said transparent panel first and second faces 14 and 16, respectively.

Referring to FIGS. 2 & 4, a method of making an integrally illuminated panel 110 is provided, including the steps of: providing transparent panel 112 having a first and second opposing faces 114 and 116, and a perimeter edge 118; forming a channel 126 into said transparent panel first face 114, along said perimeter edge 118 of said transparent panel 112; embedding a plurality of lighting elements 122 into said transparent panel 112 along said perimeter edge 118, said lighting elements 122 oriented inwardly from said perimeter edge 118; injecting sealant 124 around each of said plurality of lighting elements; and, curing said sealant 124. A method of making an integrally illuminated panel 112 includes applying a light-reflective layer 130 to said perimeter edge. A method of making an integrally illuminated panel includes applying a light-absorbing layer 130 to said perimeter edge. A method of making an integrally illuminated panel includes applying a light-reflective layer 134 to said transparent panel second face 116. A method of making an integrally illuminated panel includes applying a light absorbing layer 134 to said transparent panel second face 116. A method of making an integrally illuminated panel includes applying a translucent display layer 132 to at least said transparent panel first face 114.

Those skilled in the art will recognize that numerous modifications and changes may be made to the preferred embodiment without departing from the scope of the claimed invention. It will, of course, be understood that modifications of the invention, in its various aspects, will be apparent to those skilled in the art, some being apparent only after study, others being matters of routine mechanical, chemical and electronic design. No single feature, function or property of the preferred embodiment is essential. Other embodiments are possible, their specific designs depending upon the particular application. As such, the scope of the invention should not be limited by the particular embodiments herein described but should be defined only by the appended claims and equivalents thereof.

I claim:

1. An integrally illuminated panel, comprising:
    a transparent panel having first and second opposing faces and a perimeter edge;
    a plurality of lighting elements embedded into said transparent panel along said perimeter edge, each of said plurality of lighting elements oriented inwardly from said perimeter edge; and
    wherein said transparent panel further includes a channel formed into said transparent panel extending along said perimeter edge, and wherein said plurality of lighting elements is embedded into said transparent panel within said channel.

2. An integrally illuminated panel as in claim 1, wherein said channel is formed into said perimeter edge.

3. An integrally illuminated panel as in claim 1, wherein said transparent panel is clear acrylic.

4. An integrally illuminated panel as in claim 1, wherein said channel is formed into said transparent panel first face.

5. An integrally illuminated panel as in claim 1, further comprising transparent sealant injected around said plurality of lighting elements.

6. An integrally illuminated panel as in claim 5, wherein said transparent sealant is clear acrylic resin.

7. An integrally illuminated panel as in claim 1, further comprising:
    a translucent panel overlaid onto at least one of said transparent panel first and second faces.

8. An integrally illuminated panel as in claim 1, further comprising:
    a translucent panel overlaid onto said transparent panel first face; and,
    an opaque panel overlaid onto said transparent panel second face.

9. An integrally illuminated panel as in claim 8, wherein said opaque panel includes a light-reflective surface and said light-reflective surface is overlaid adjacent to said transparent panel second face.

10. An integrally illuminated panel as in claim 9, wherein said opaque panel includes a light-absorbing surface and said light-absorbing surface is overlaid adjacent to said transparent panel second face.

11. An integrally illuminated panel as in claim 8, further comprising a supporting frame engaging said transparent panel around said perimeter edge, wherein said frame retains each of said translucent panel overlaid onto at least one of said transparent panel first and second faces against its respective transparent panel face.

12. An integrally illuminated panel as in claim 11, wherein said frame retains said translucent panel and said opaque panel against said transparent panel first and second face, respectively.

13. An integrally illuminated panel as in claim 1, further comprising an edge shield along said perimeter edge.

14. An integrally illuminated panel as in claim 13, wherein said edge shield includes a substantially U-shaped cross-section having first and second flanges and a bridge portion connecting said first and second flanges, said first and second flanges extending inwardly from said perimeter edge at least as far as said plurality of lighting elements.

15. An integrally illuminated panel as in claim 1, wherein said plurality of lighting elements comprises LED lights.

16. An integrally illuminated panel, comprising:
    a transparent panel having first and second opposing faces and a perimeter edge;
    a channel formed into said transparent panel first face distal from said panel perimeter edge, said channel circumscribing a substantially closed path defining a lighted region; and
    a plurality of lighting elements embedded into said channel, each of said plurality of lighting elements oriented toward the circumscribed interior of said lighted region.

17. An integrally illuminated panel as in claim 16, further comprising:
    a translucent panel overlaid onto at least one of said transparent panel first and second faces and at least partially overlapping said lighted region.

18. An integrally illuminated panel as in claim 16, further comprising:
    an opaque panel overlaid onto at least one of said transparent panel first and second faces and at least partially overlapping said lighted region.

\* \* \* \* \*